United States Patent
Wang et al.

(10) Patent No.: US 11,005,698 B2
(45) Date of Patent: May 11, 2021

(54) COMMUNICATION METHOD AND COMMUNICATIONS APPARATUS

(71) Applicant: HUAWEI TECHNOLOGIES CO., LTD., Guangdong (CN)

(72) Inventors: Fan Wang, Shanghai (CN); Zhenfei Tang, Ottawa (CA); Zhang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/502,775

(22) Filed: Jul. 3, 2019

(65) Prior Publication Data

US 2019/0327123 A1    Oct. 24, 2019

Related U.S. Application Data

(63) Continuation of application No. PCT/CN2018/071547, filed on Jan. 5, 2018.

(30) Foreign Application Priority Data

Jan. 6, 2017    (CN) .......................... 201710010992.X

(51) Int. Cl.
*H04L 27/26* (2006.01)
*H04J 11/00* (2006.01)
(Continued)

(52) U.S. Cl.
CPC ...... *H04L 27/2656* (2013.01); *H04J 11/0073* (2013.01); *H04J 11/0076* (2013.01);
(Continued)

(58) Field of Classification Search
CPC ............... H04W 48/10; H04W 56/001; H04L 27/2656; H04J 11/0073; H04J 11/0076; H04J 11/0079
(Continued)

(56) References Cited

U.S. PATENT DOCUMENTS

2012/0163305 A1* 6/2012 Nimbalker ........ H04W 52/0206
370/329
2013/0010715 A1* 1/2013 Dinan ................... H04L 5/0053
370/329
(Continued)

FOREIGN PATENT DOCUMENTS

CN         103237354 A      8/2013
CN         103391264 A      11/2013
(Continued)

OTHER PUBLICATIONS

PCT International Search Report and Written Opinion issued in International Application No. PCT/CN2018/071547 dated Mar. 22, 2018, 15 pages (with English translation).
(Continued)

*Primary Examiner* — Phong La
(74) *Attorney, Agent, or Firm* — Fish & Richardson P.C.

(57) ABSTRACT

Examples communication methods and communications apparatus are described. In one example method, a base station sends a first synchronization signal block, where the first synchronization signal (SS) block includes a primary SS, a secondary SS, and information carried on a physical broadcast channel (PBCH). In addition, the base station sends a second SS block, where the second SS block includes a primary SS or includes a primary SS and a secondary SS, and does not include information carried on the PBCH. The first SS block is used by a terminal to access the base station. The second SS block is used to perform time and frequency synchronization after the terminal accesses the base station.

20 Claims, 7 Drawing Sheets

(51) Int. Cl.
*H04W 48/10* (2009.01)
*H04W 56/00* (2009.01)

(52) U.S. Cl.
CPC ......... *H04J 11/0079* (2013.01); *H04W 48/10* (2013.01); *H04W 56/001* (2013.01)

(58) Field of Classification Search
USPC ........................................................ 370/336
See application file for complete search history.

(56) References Cited

U.S. PATENT DOCUMENTS

| | | | |
|---|---|---|---|
| 2013/0028204 A1* | 1/2013 | Dinan | H04L 5/0098 370/329 |
| 2013/0188613 A1* | 7/2013 | Dinan | H04L 5/0055 370/336 |
| 2014/0198744 A1* | 7/2014 | Wang | H04W 52/146 370/329 |
| 2016/0227575 A1* | 8/2016 | Furuskog | H04W 72/14 |
| 2016/0262066 A1* | 9/2016 | Ozturk | H04W 36/026 |
| 2017/0048027 A1* | 2/2017 | Reial | H04W 48/12 |
| 2017/0311342 A1* | 10/2017 | You | H04B 7/088 |
| 2018/0062781 A1* | 3/2018 | Ly | H04J 11/0073 |
| 2018/0109344 A1* | 4/2018 | Ly | H04J 11/00 |
| 2018/0139084 A1* | 5/2018 | Jung | H04L 27/2657 |
| 2018/0184321 A1* | 6/2018 | Kim | H04W 24/10 |
| 2018/0262975 A1* | 9/2018 | Martinez Tarradell | H04W 16/10 |
| 2019/0182817 A1* | 6/2019 | Agiwal | H04W 72/0406 |
| 2019/0281534 A1* | 9/2019 | Yu | H04B 7/0617 |
| 2020/0059874 A1* | 2/2020 | Noh | H04L 5/0007 |
| 2020/0059967 A1* | 2/2020 | Kim | H04W 74/0833 |

FOREIGN PATENT DOCUMENTS

| | | |
|---|---|---|
| CN | 106161317 A | 11/2016 |
| CN | 106162597 A | 11/2016 |
| WO | 2016161981 A1 | 10/2016 |

OTHER PUBLICATIONS

R1-1611668—Huawei et al., "Unified on-demand initial access signals transmission for connected and idle UE Mobility," 3GPP TSG RAN WG1 Meeting #87, Reno, USA, Nov. 14-18, 2016, 6 pages.

R1- 1612181—CMCC, "Gradual UE specific (GUS) initial access and channel associations," 3GPP TSG RAN WG1 Meeting #86bis, Reno, USA, Nov. 10-14, 2016, 4 pages.

Huawei Hisilicon, "Design of broadcast signal/channel", 3GPP Draft; R1-1611695, vol. RAN WG1, XP051175665, Nov. 13, 2016, 4 pages.

LG Electronics, "Discussion on SS Block and SS Burst", 3GPP Draft; R1-1611786, vol. RAN WG1, XP051175755, Nov. 13, 2016, 4 pages.

Huawei Hisilicon, "Unified single/multiple beam operations for initial access", 3GPP Draft; R1-1611667, vol. RAN WG1, XP051175639, Nov. 13, 2016, 10 pages.

MCC Support, "Final Report of 3GPP TSG RAN WG1 #86bis v1.0.0(Lisbon, Portugal, Oct. 10-14, 2016)", 3GPP TSG RAN WG1 Meeting #87, Reno, USA, R1-1611081, Nov. 14-18, 2016, 160 pages.

Extended European Search Report issued in European Application No. 18736172.0 dated Nov. 26, 2019, 13 pages.

Office Action issued in Indian Application No. 201947027053 dated Oct. 22, 2020, 6 pages.

* cited by examiner

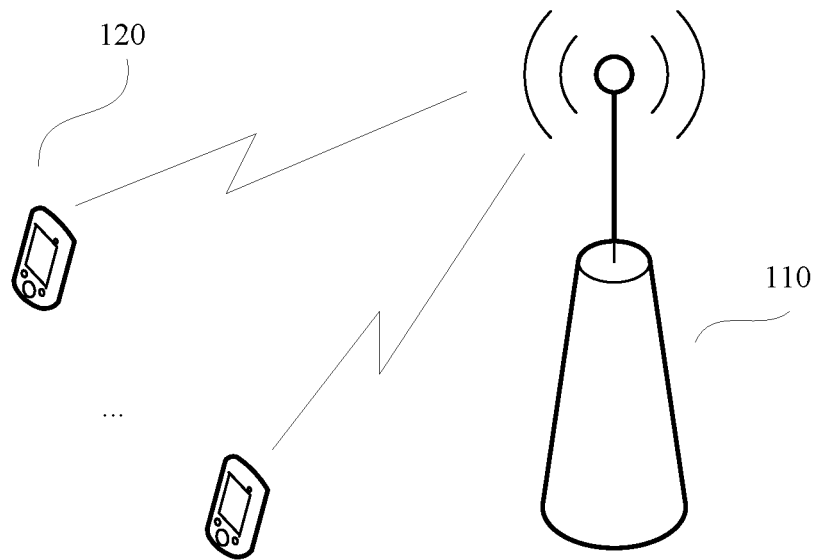

FIG. 1

```
A base station sends a first synchronization signal block, where the first
synchronization signal block includes a primary synchronization signal,
a secondary synchronization signal, and information carried on a
physical broadcast channel, and the first synchronization signal block is
used by a terminal to access the base station
```
S201

```
The base station sends a second synchronization signal block, where the
second synchronization signal block includes a primary synchronization
signal or includes a primary synchronization signal and a secondary
synchronization signal, and does not include information carried on the
physical broadcast channel, and the second synchronization signal block
is used to perform time and frequency synchronization after the terminal
accesses the base station
```
S202

FIG. 2

COMMUNICATION METHOD AND COMMUNICATIONS APPARATUS

CROSS-REFERENCE TO RELATED APPLICATIONS

This application is a continuation of International Application No. PCT/CN2018/071547, filed on Jan. 5, 2018, which claims priority to Chinese Patent Application No. 201710010992.X, filed on Jan. 6, 2017. The disclosures of the aforementioned applications are hereby incorporated by reference in their entireties.

TECHNICAL FIELD

This application relates to the field of communications technologies, and in particular, to a communication method and a communications apparatus.

BACKGROUND

As communications technologies develop, a larger communication capacity is required, and existing frequency band resources can no longer satisfy the communication capacity requirement. Therefore, using frequency band resources of a high frequency (which is above 6 GHz, such as a millimeter-wave band or a centimeter-wave band) in mobile communications technologies becomes a trend of future development.

After being powered on, a terminal performs cell searching, learns of an identifier of a serving cell by searching for a synchronization signal (SS), and performs frame synchronization. The SS includes a primary synchronization signal (PSS) and a secondary synchronization signal (SSS). The SS may be periodically sent. After accessing a wireless network, the terminal may perform time and frequency synchronization by using the SS.

After high-frequency communication is introduced, a concept of synchronization signal block (SS block) is introduced. In addition to the primary synchronization signal and the secondary synchronization signal, a physical broadcast channel (PBCH) may further be transmitted on a resource of the SS block. In this case, sending the SS block to implement time and frequency synchronization of the terminal may cause a waste of resources.

SUMMARY

Embodiments of this application provide a communication method and a communications apparatus, to send different synchronization signal blocks to a terminal based on different objectives, thereby reducing a waste of time-frequency resources.

According to a first aspect, an embodiment of this application provides a communication method. The method includes: sending, by a base station, a first synchronization signal block, where the first synchronization signal block includes a primary synchronization signal, a secondary synchronization signal, and information carried on a physical broadcast channel, and the first synchronization signal block is used by a terminal to access the base station; and sending, by the base station, a second synchronization signal block, where the second synchronization signal block includes a primary synchronization signal or includes a primary synchronization signal and a secondary synchronization signal, and does not include information carried on the physical broadcast channel, and the second synchronization signal block is used by the terminal to perform time and frequency synchronization after the terminal accesses the base station.

According to a second aspect, an embodiment of this application provides a communication method. The method includes: receiving, by a terminal, a first synchronization signal block sent by a base station, where the first synchronization signal block includes a primary synchronization signal, a secondary synchronization signal, and information carried on a physical broadcast channel; accessing, by the terminal, the base station based on the first synchronization signal block; receiving, by the terminal, a second synchronization signal block sent by the base station, where the second synchronization signal block includes a primary synchronization signal or includes a primary synchronization signal and a secondary synchronization signal, and does not include information carried on the physical broadcast channel; and performing, by the terminal, time and frequency synchronization based on the second synchronization signal block.

According to a third aspect, an embodiment of this application provides a communications apparatus, applied to a base station, where the communications apparatus includes units or means for performing the steps of the first aspect.

According to a fourth aspect, an embodiment of this application provides a communications apparatus, applied to a terminal, where the communications apparatus includes units or means for performing the steps of the second aspect.

According to a fifth aspect, this application provides a communications apparatus, including a processor and a memory, where the memory is configured to store a program, and the processor invokes the program stored in the memory, to perform the method according to the first aspect of this application.

According to a sixth aspect, this application provides a communications apparatus, including a processor and a memory, where the memory is configured to store a program, and the processor invokes the program stored in the memory, to perform the method according to the second aspect of this application.

According to a seventh aspect, this application provides a computer program, and when executed by a processor, the program is used to perform the method according to the first aspect or the second aspect.

According to an eighth aspect, a program product such as a computer readable storage medium is provided, and includes the program according to the seventh aspect.

In all the foregoing aspects, the second synchronization signal block does not include the information carried on the physical broadcast channel, and performing time and frequency synchronization by using the second synchronization signal block can reduce a waste of time-frequency resources. The base station can send different synchronization signal blocks to the terminal based on different objectives, thereby reducing a waste of time-frequency resources.

Optionally, a time length of the first synchronization signal block is greater than a time length of the second synchronization signal block. Therefore, the terminal takes a shorter time to scan the second synchronization signal block, thereby saving energy of the terminal.

Optionally, the base station periodically sends the first synchronization signal block. The base station periodically or aperiodically sends the second synchronization signal block. In other words, the first synchronization signal block is periodically sent, and the second synchronization signal block is periodically sent or aperiodically sent. For example, the second synchronization signal block is sent when the base station is triggered by an event, so that the second synchronization signal block is sent more accurately.

Optionally, the base station sends a synchronization signal block by using a synchronization signal burst. To be specific, the base station sends a first synchronization signal burst, where the first synchronization signal burst includes at least one first synchronization signal block. The base station sends a second synchronization signal burst, where the second synchronization signal burst includes at least one second synchronization signal block. In this case, the terminal receives the first synchronization signal burst sent by the base station, where the first synchronization signal burst includes the at least one first synchronization signal block, and receives the second synchronization signal burst sent by the base station, where the second synchronization signal burst includes the at least one second synchronization signal block.

Optionally, a maximum quantity of first synchronization signal blocks included in the first synchronization signal burst is M and a maximum quantity of second synchronization signal blocks included in the second synchronization signal burst is N, where M and N are positive integers. M and N may be configured by the base station or M and N are predefined parameters. In addition, M and N may be different.

Optionally, at least one of the primary synchronization signals and the secondary synchronization signals of the first synchronization signal block and the second synchronization signal block are different in at least one of the following: occupied time resource, occupied frequency resource, and candidate sequence.

In this case, the terminal may determine, based on at least one of the occupied time resource, the occupied frequency resource, and the candidate sequence of at least one of a primary synchronization signal and a secondary synchronization signal in a received synchronization signal block, whether the received synchronization signal block is a first synchronization signal block or a second synchronization signal block.

Optionally, the base station sends the second synchronization signal block in any one of the following cases:

The base station sends the second synchronization signal block when sending a paging signal. For example, the second synchronization signal block and the paging signal are sent in a same time unit. In this case, the terminal receives the second synchronization signal block when receiving the paging signal. For example, the terminal receives the second synchronization signal block in a same time unit where the paging signal is received.

The base station receives a random access preamble sent by the terminal; and sends the second synchronization signal block to the terminal based on the random access preamble. In this case, before receiving the second synchronization signal block sent by the base station, the terminal sends the random access preamble to the base station, where the random access preamble is used to trigger the base station to send the second synchronization signal block.

The base station sends downlink control information to the terminal on a first carrier, where the downlink control information includes indicating information that is used to indicate that the second synchronization signal block is sent on a second carrier; and the base station sends the second synchronization signal block to the terminal on the second carrier. In this case, before receiving the second synchronization signal block sent by the base station, the terminal receives, on the first carrier, the downlink control information sent by the base station, where the downlink control information includes indicating information that is used to indicate that the second synchronization signal block is sent on the second carrier; and the terminal receives, on the second carrier according to the indicating information, the second synchronization signal block sent by the base station.

The base station receives, on a first carrier, uplink control information sent by the terminal, where the uplink control information includes information indicating out-of-synchronization on a second carrier; and the base station sends the second synchronization signal block based on the uplink control information by using the second carrier. In this case, before receiving the second synchronization signal block sent by the base station, the terminal sends the uplink control information to the base station on the first carrier, where the uplink control information includes the information indicating out-of-synchronization on the second carrier; and the terminal receives, on the second carrier, the second synchronization signal block sent by the base station.

According to the communication method and the communications apparatus provided in the embodiments of this application, the base station sends the first synchronization signal block and the second synchronization signal block. The first synchronization signal block includes the primary synchronization signal, the secondary synchronization signal, and the information carried on the physical broadcast channel. The second synchronization signal block includes the primary synchronization signal or includes the primary synchronization signal and the secondary synchronization signal, and does not include the information carried on the physical broadcast channel. The first synchronization signal block is used by the terminal to access the base station. The second synchronization signal block is used to perform time and frequency synchronization after the terminal accesses the base station. It can be learned that, the second synchronization signal block does not include the information carried on the physical broadcast channel, and performing time and frequency synchronization by using the second synchronization signal block can reduce a waste of time-frequency resources.

BRIEF DESCRIPTION OF DRAWINGS

FIG. 1 is a schematic diagram of a communication scenario according to an embodiment of this application;

FIG. 2 is a flowchart of a communication method according to an embodiment of this application;

DESCRIPTION OF EMBODIMENTS

Figure 3:
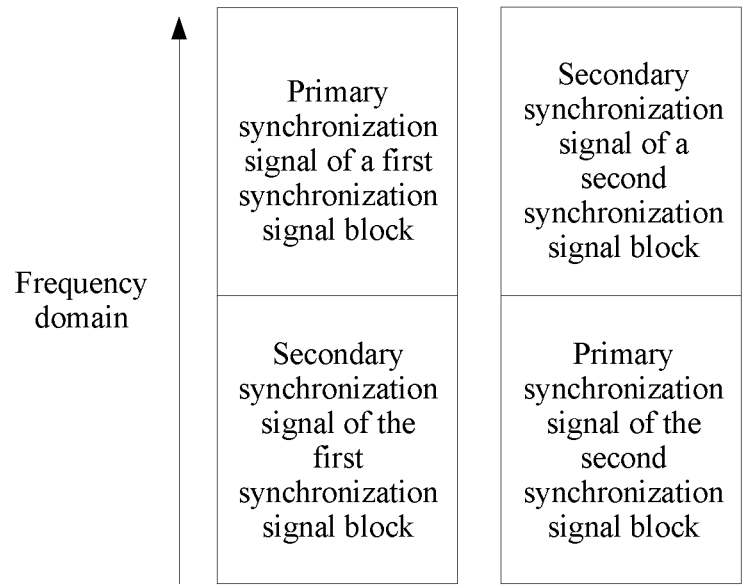
FIG. 3 shows a frequency domain pattern configuration according to an embodiment of this application.

The technical solutions in the embodiments of this application are further described in detail with reference to the accompanying drawings and the embodiments as follows:

First, some terms used in this application are explained and described, so that the terms can be easily understood by a person skilled in the art.

(1). A terminal, also referred to as user equipment (UE), a mobile station (MS), or a mobile terminal (MT), is a device providing voice and/or data connectivity for a user, such as a handheld device or an in-vehicle device having a wireless connection function. Commonly seen terminals include, for example, a mobile phone, a tablet computer, a notebook computer, a palmtop computer, a mobile Internet device (MID), and a wearable device such as a smartwatch, a smart band, or a pedometer.

(2). A radio access network (RAN) is a part that is in a network and that connects a terminal to a wireless network. A base station, also referred to as a RAN device, is a device that is in the RAN and that connects the terminal to the wireless network, and includes but is not limited to: a transmission reception point (TRP), an evolved NodeB (eNB), a radio network controller (RNC), a NodeB (NB), a base station controller (BSC), a base transceiver station (BTS), a home eNodeB (for example, Home evolved NodeB, or Home NodeB, HNB), a baseband unit (BBU), or a Wi-Fi access point (AP).

(3). "A plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

FIG. 1 is a schematic diagram of a communication scenario according to an embodiment of this application. As shown in FIG. 1, a terminal 120 accesses a wireless network through a base station 110, to obtain a service of an external network (for example, the Internet) through the wireless network, or to communicate with another terminal through the wireless network.

After being powered on, the terminal 120 performs cell searching. After the cell searching, the terminal 120 achieves downlink synchronization with a cell, and can receive downlink data. Subsequently, the terminal initiates a random access process to establish a connection to the cell and achieve uplink synchronization with the cell, so that uplink transmission can be performed.

Usually, an SS block occupies a symbol, and a PSS, an SSS, an extended synchronization signal (ESS), a PBCH, and a beam reference signal (BRS) may be transmitted in the SS block. One function of the SS block is to provide a synchronization signal for the terminal, so that the terminal can perform time and frequency synchronization. There is more than one scenario in which the terminal needs to perform time and frequency synchronization. For example, when the terminal initially accesses a network, initial synchronization is performed. In this case, the terminal receives a PSS, an SSS, and a PBCH. When the terminal is in an out-of-synchronization state because of poor channel quality or entering an idle state or another reason, the terminal performs time and frequency synchronization. In this case, the terminal does not need information on the PBCH or a BRS. In this case, there is a waste of time domain resources.

Considering the foregoing problem, this embodiment of this application provides two types of SS blocks, namely, a first SS block and a second SS block. The first SS block includes a PSS, an SSS, and information carried on a PBCH. The second synchronization signal block includes a PSS or includes a PSS and an SSS. The first SS block may further include another signal such as a BRS. This is not limited herein. The second SS block does not include information carried on the PBCH. Whether a BRS is included is not limited. Optionally, the BRS is not included. Therefore, the base station may send the second SS block to the terminal when only time and frequency synchronization needs to be performed, thereby saving a time-frequency resource.

The base station sends the first synchronization signal block and the second synchronization signal block to the terminal, so that the terminal accesses the base station based on the first synchronization signal block, and performs time and frequency synchronization based on the second synchronization signal block after accessing the base station. That the terminal accesses the base station includes: finding a cell identity (ID), performing time and frequency synchronization on a found cell, and determining a frame number and a cell-related resource configuration.

The base station may periodically send the first synchronization signal block based on a predefined period. In addition to accessing the base station based on the first synchronization signal block, the terminal may further perform, after accessing the base station, time and frequency synchronization based on the first synchronization signal block during out-of-synchronization. When the terminal performs time and frequency synchronization based on the first synchronization signal block, information carried on a physical broadcast channel and included in the first synchronization signal block is irrelevant to time and frequency synchronization, causing a waste of resources. It should be noted that, in addition to periodically sending the first synchronization signal block, the base station may send the first synchronization signal block aperiodically (for example, when being triggered by an event). If periodically sending is used for the first synchronization signal block, the terminal needs to wait a relatively long time, increasing a synchronization delay of the terminal. In this embodiment of this application, because the second synchronization signal block does not include the information carried on the PBCH, when time and frequency synchronization is performed by using the second synchronization signal block, a waste of time-frequency resources is reduced.

FIG. 2 is a flowchart of a communication method according to an embodiment of this application. As shown in FIG. 2, the method includes the following steps.

S201. A base station sends a first synchronization signal block, where the first synchronization signal block includes a primary synchronization signal, a secondary synchronization signal, and information carried on a physical broadcast channel, and the first synchronization signal block is used by a terminal to access the base station.

S202. The base station sends a second synchronization signal block, where the second synchronization signal block includes a primary synchronization signal or includes a primary synchronization signal and a secondary synchronization signal, and does not include information carried on the physical broadcast channel, and the second synchronization signal block is used by the terminal to perform time and frequency synchronization after the terminal accesses the base station.

In a specific embodiment of this application, the first synchronization signal block and the second synchronization signal block are defined. The first synchronization signal block includes a PSS, an SSS, and a PBCH, and the second synchronization signal block includes a PSS or includes a PSS and an SSS, namely, a secondary synchronization signal. Therefore, the second synchronization signal block is sent when the terminal only needs to perform time and frequency synchronization. Because the second synchronization signal block does not include the information carried on the PBCH, a waste of time-frequency resources is reduced.

The first synchronization signal block and the second synchronization signal block may be sent by using a synchronization signal burst (SS burst). The SS burst includes one or more SS blocks. A synchronization signal burst set (SS burst set) includes one or more SS bursts. The SS blocks in the SS burst may be continuous or discontinuous. In this case, the first synchronization signal block is sent by using a first synchronization signal burst, and the second synchronization signal block is sent by using a second synchronization signal burst. The first synchronization signal burst may include one or more first synchronization signal blocks, and the second synchronization signal burst may include one or more second synchronization signal blocks.

A maximum quantity of first synchronization signal blocks included in the first synchronization signal burst is M and a maximum quantity of second synchronization signal blocks included in the second synchronization signal burst is N, where M and N are positive integers. M and N are configured by the base station or M and N are predefined parameters. In addition, M and N may be different. When M and N are different, a quantity of first synchronization signal blocks included in the first synchronization signal burst and a quantity of second synchronization signal blocks included in the second synchronization signal burst may be the same, because M and N represent only maximum quantities.

The base station may periodically send the first synchronization signal block. In addition, a period for sending the first synchronization signal block may be agreed on in a standard or preconfigured. A preconfigured period may be a value, or may be a set. When a set is configured, selection may be performed based on a requirement. For example, the preconfigured period may be {10 ms}. In this case, the period for sending the first synchronization signal block is 10 ms. In addition, a frequency domain resource of the first synchronization signal block may further be configured. The first synchronization signal block is used by the terminal for initial access, and a frequency used for sending the first synchronization signal block is a value in a preconfigured set. The set may be defined in the standard. For example, the preconfigured set may be {f0}, or {f0, f1, f2, f3}, or the like, where f0, f1, f2, and f3 are values related to a center frequency of a downlink frequency band and a carrier bandwidth.

The base station may configure in such a manner that the primary synchronization signal of the first synchronization signal block is different from that of the second synchronization signal block in at least one of the following: occupied time resource, occupied frequency resource, and candidate sequence. In this way, the terminal may determine, based on this, whether a received synchronization signal block is a first synchronization signal block or a second synchronization signal block. Similarly, the base station may configure in such a manner that the secondary synchronization signal of the first synchronization signal block is different from that of the second synchronization signal block in at least one of the following: occupied time resource, occupied frequency resource, and candidate sequence. In this way, the terminal determines whether a received synchronization signal block is a first synchronization signal block or a second synchronization signal block. Certainly, alternatively, both the primary synchronization signal and the secondary synchronization signal may be configured to occupy different time resources and frequency resources or use different candidate sequences. The candidate sequence is, for example, a ZC (Zadoff-Chu) sequence.

For example, the base station uses different sequences when configuring the first synchronization signal block and the second synchronization signal block. The terminal determines, based on a received sequence, whether a synchronization signal block is a first synchronization signal block or a second synchronization signal block.

For example, the base station configures in such a manner that the first synchronization signal block and the second synchronization signal block have different frequency domain patterns or time domain patterns. The terminal determines, based on a frequency domain pattern or a time domain pattern of a received synchronization signal block, whether the synchronization signal block is a first synchronization signal block or a second synchronization signal block.

Configuration of the first synchronization signal block and the second synchronization signal block herein is configuration of the PSS and/or the SSS in the first synchronization signal block and the second synchronization signal block.

FIG. 3 shows a frequency domain pattern configuration according to an embodiment of this application. As shown in FIG. 3, when a base station configures a first synchronization signal block, a frequency occupied by a primary synchronization signal is higher than a frequency occupied by a secondary synchronization signal, or certainly, conversely, a frequency occupied by a primary synchronization signal is lower than a frequency occupied by a secondary synchronization signal. When the base station configures a second synchronization signal block, a frequency occupied by a primary synchronization signal is lower than a frequency occupied by a secondary synchronization signal, or certainly, conversely, a frequency occupied by a primary synchronization signal is higher than a frequency occupied by a secondary synchronization signal.

Figure 4:
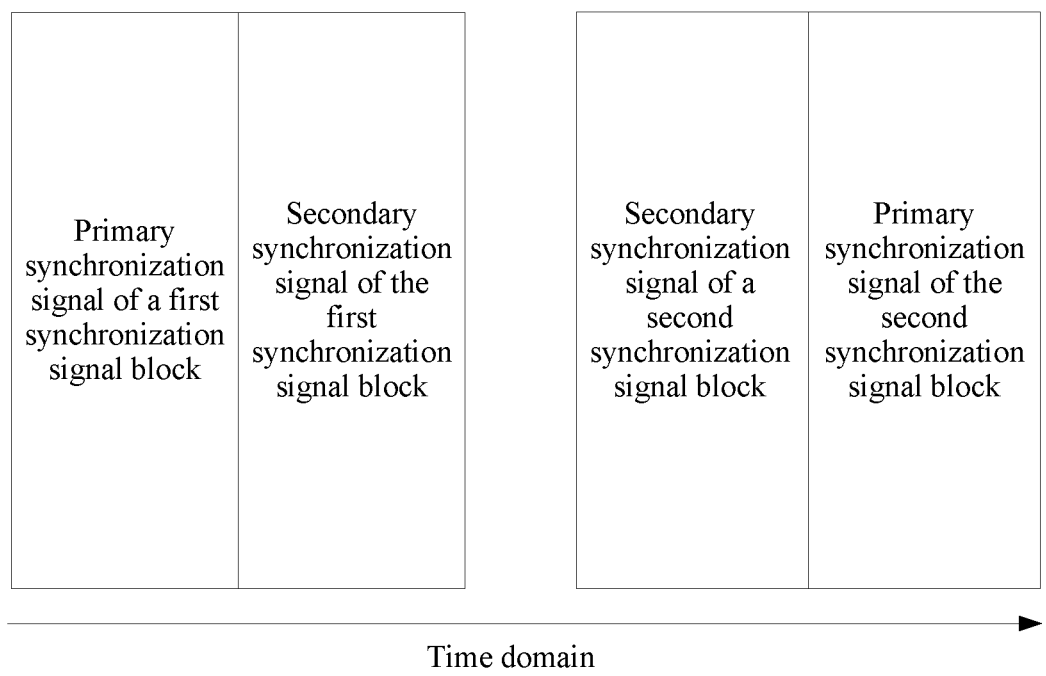
FIG. 4 shows a time domain pattern configuration according to an embodiment of this application.

FIG. 4 shows a time domain pattern configuration according to an embodiment of this application. As shown in FIG. 4, when a base station configures a first synchronization signal block, a time occupied by a primary synchronization signal is earlier than a time occupied by a secondary synchronization signal, or certainly, conversely, a time occupied by a primary synchronization signal is later than a time occupied by a secondary synchronization signal. When the base station configures a second synchronization signal block, a time occupied by a primary synchronization signal is later than a time occupied by a secondary synchronization signal, or certainly, conversely, a time occupied by a primary synchronization signal is earlier than a time occupied by a secondary synchronization signal.

In an embodiment of this application, a time length of the first synchronization signal block is greater than a time length of the second synchronization signal block. For example, a quantity of symbols occupied by the first synchronization signal block is greater than a quantity of symbols occupied by the second synchronization signal block. Alternatively, a quantity of symbols occupied by the first synchronization signal block is the same as a quantity of symbols occupied by the second synchronization signal block, but time lengths of the symbols are different. The time length of the first synchronization signal block or a time length of a second synchronization signal block is a length of a time during which the first synchronization signal block or the second synchronization signal block lasts, or a size of an occupied time domain resource. Therefore, the terminal takes a shorter time to scan the second synchronization signal block, thereby reducing energy consumption of the terminal.

In an embodiment of this application, the first synchronization signal block and the second synchronization signal block are periodically sent.

A period of the second synchronization signal block may be configured by the base station, and sent to the terminal by using a PBCH, a system information block (SIB), or higher layer signaling. The higher layer signaling may be, for example, radio resource control (RRC) signaling.

Figure 5:
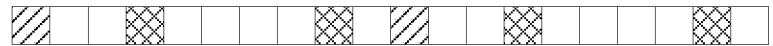
FIG. 5 is a schematic diagram of periodically sending a synchronization signal block according to a specific embodiment of this application.

FIG. 5 is a schematic diagram of periodically sending a synchronization signal block according to a specific embodiment of this application. As shown in FIG. 5, both a first synchronization signal block and a second synchronization signal block are periodically sent, and a period of the first synchronization signal block is greater than a period of the second synchronization signal block. For example, the period of the first synchronization signal block is 10 ms, and the period of the second synchronization signal block is 5 ms. For example, a base station sends a first synchronization signal block to a terminal at a $0^{th}$ millisecond, so that the user terminal finds a cell identity based on the first synchronization signal block, performs time and frequency synchronization on a found cell, and determines a frame number and a cell-related resource configuration. In addition, the base station resends the first synchronization signal block to the terminal after 10 milliseconds. The base station sends a second synchronization signal block to the user terminal at a $3^{rd}$ millisecond, and the terminal may perform time and frequency synchronization based on the second synchronization signal block. In addition, the base station resends the second synchronization signal block to the terminal at an $8^{th}$ millisecond.

Figure 6:
FIG. 6 is a schematic diagram of aperiodically sending a second synchronization signal block according to a specific embodiment of this application.

In another embodiment of this application, the first synchronization signal block is periodically sent, and the second synchronization signal block is sent aperiodically, for example, when the base station is triggered by an event. The triggering event may be a triggering procedure or a triggering signal. FIG. 6 is a schematic diagram of aperiodically sending a second synchronization signal block according to a specific embodiment of this application. As shown in FIG. 6, the first synchronization signal block is periodically sent, and the second synchronization signal block is sent when a base station is triggered by an event. When the base station receives a trigger signal sent by the terminal, the base station sends the second synchronization signal block to the terminal. Alternatively, when the base station operates in a procedure, the base station sends the second synchronization signal block to the terminal. The procedure or the trigger signal may be related to a case in which the terminal is in an out-of-synchronization state.

Figure 7:
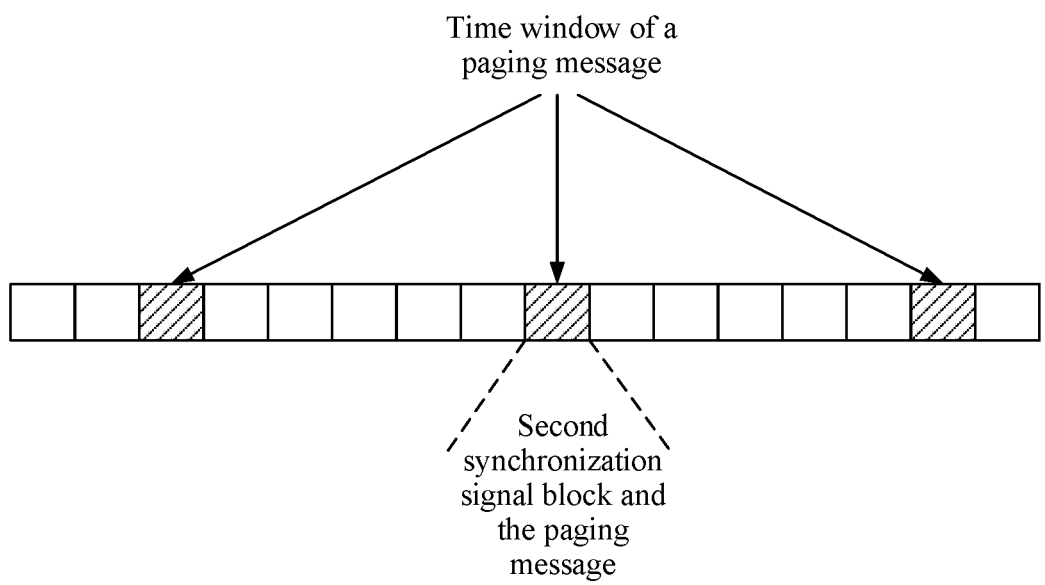
FIG. 7 is a schematic diagram of sending a second synchronization signal block on a paging occasion according to an embodiment of this application.

In a first example, that the base station sends the second synchronization signal block to the terminal may be triggered by a paging occasion of the terminal. FIG. 7 is a schematic diagram of sending a second synchronization signal block on a paging occasion according to an embodiment of this application. As shown in FIG. 7, the base station sends the second synchronization signal block when sending a paging signal. To be specific, both the second synchronization signal block and a paging message are sent in a time window of the paging message.

When the terminal is in idle mode, the terminal periodically wakes up to receive the paging message sent by the base station. To be specific, the second synchronization signal block is sent in a time unit when the paging message is sent to the terminal. The terminal receives the second synchronization signal block when receiving the paging message. Then the terminal performs time and frequency synchronization based on the second synchronization signal block. A time unit is a time unit defined in a standard, for example, a mini-slot, a slot, or a frame discussed in NR.

In the foregoing examples, the time unit in which the paging message is located may include a plurality of resource blocks. A specific location of a resource block in which the second synchronization signal block is located, in the time unit may be agreed on in a standard or configured at a cell level or configured at a terminal level.

When a location of a resource block in which the second synchronization signal block is located, in the time unit is agreed on in the standard, one or more time-frequency locations at which the second synchronization signal block may be configured are agreed on in the standard. When sending the paging message, the base station configures the second synchronization signal block in the time unit. The second synchronization signal block is at any one of the time-frequency locations agreed on in the standard. When receiving the paging message, the terminal receives the second synchronization signal block at some of the time-frequency locations, to perform time and frequency synchronization.

When a resource block in which the second synchronization signal block is located, in the time unit is configured at the cell level, the base station determines the specific location that is of the second synchronization signal block and that is in the resource block of the time unit. The base station sends the specific location that is of the second synchronization signal block and that is in the resource block of the time unit to the terminal when sending cell configuration information to the terminal. The UE receives the second synchronization signal block based on the cell configuration information and performs time and frequency synchronization.

When a resource block in which the second synchronization signal block is located, in the time unit is configured at the terminal level, the base station determines the specific location that is of the second synchronization signal block and that is in the resource block of the time unit. The base station sends the specific location that is of the second synchronization signal block and that is in the resource block of the time unit to the terminal by using higher layer signaling. The terminal receives the second synchronization signal block based on the higher layer signaling and performs time and frequency synchronization. In an example, the higher layer signaling may be RRC signaling.

In a specific embodiment of this application, when the second synchronization signal block is sent in the time window of the paging message, if there is no terminal that needs to be woken up, the time window may not be used to send the second synchronization signal block.

In a second example, that the base station sends the second synchronization signal block to the terminal may be triggered by receiving a signal sent by the terminal. Specifically, when the terminal is out of time and frequency synchronization with the base station, the terminal sends a synchronization signal obtaining request to the base station. The base station sends the second synchronization signal block to the terminal based on the synchronization signal obtaining request of the terminal. The terminal receives the second synchronization signal block sent by the base station, and performs time and frequency synchronization based on the second synchronization signal block.

Figure 8:
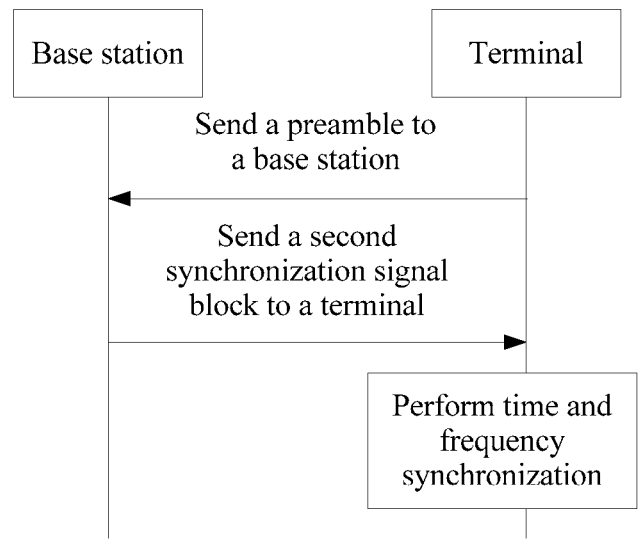
FIG. 8 is a schematic diagram of triggering sending of a second synchronization signal block by receiving a signal sent by a terminal according to an embodiment of this application.

FIG. 8 is a schematic diagram of triggering sending of a second synchronization signal block by receiving a signal sent by a terminal according to an embodiment of this application. As shown in FIG. 8, when it is determined that the terminal is out-of-synchronization with a base station on a beam, the terminal sends a random access preamble to the base station.

A synchronization signal obtaining request sent by the terminal to the base station is sent by using a preamble. A sequence set for preambles for sending the synchronization signal obtaining request may be different from a sequence set for preambles for initiating a random access procedure, or the preamble for sending the synchronization signal obtaining request and the preamble for initiating a random access procedure occupy different time-frequency resources for sending. When receiving the preamble, the base station determines whether the preamble is used to trigger sending of a second synchronization signal block. When the preamble is used to trigger the sending of the second synchronization signal block, the base station sends the second synchronization signal block to the terminal.

In a specific embodiment of this application, a time-frequency resource used by the second synchronization signal block may be agreed on in a standard or configured at a cell level or configured at a terminal level. That the time-frequency resource is agreed on in a standard or configured at a cell level or configured at a terminal level is consistent with the description in the foregoing example, and details are not described herein again.

In a third example, the base station may send the second synchronization signal block to the terminal by using a plurality of carriers. It should be noted that, the method is applied to a scenario in which the base station communicates with the terminal by using a plurality of carriers.

Figure 9:
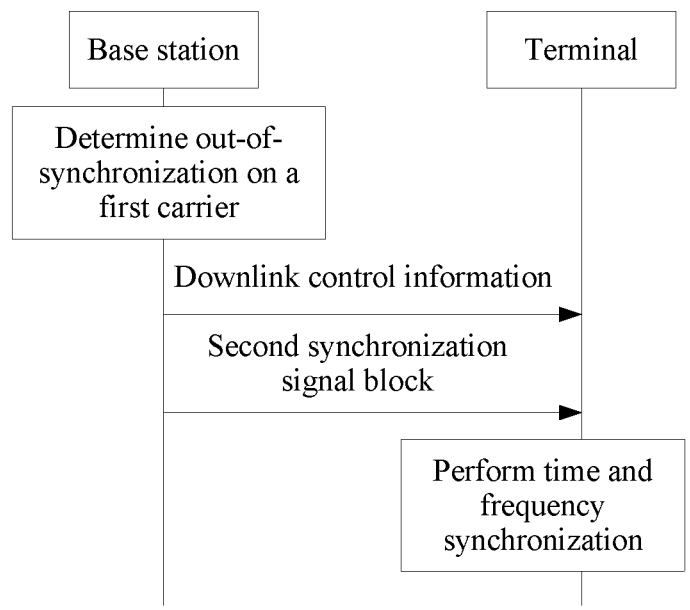
FIG. 9 is a schematic diagram of a method for sending a second synchronization signal block during multicarrier communication according to a specific embodiment of this application.
Figure 10:
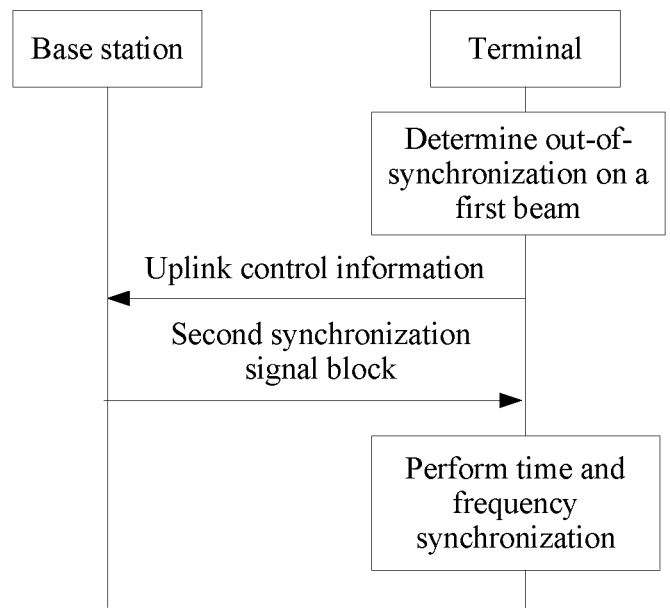
FIG. 10 is a schematic diagram of a method for sending a second synchronization signal block during multicarrier communication according to an embodiment of this application.

In a possible case, FIG. 9 is a schematic diagram of a method for sending a second synchronization signal block during multicarrier communication according to a specific embodiment of this application. As shown in FIG. 9, when a base station determines that a terminal is out-of-synchronization with the base station on a carrier and the terminal remains synchronized with the base station on another carrier, the base station notifies, on the carrier on which the synchronization is remained, the terminal that a second synchronization signal block is to be sent on the carrier on which the terminal is out-of-synchronization with the base station. In this case, a location of a time-frequency resource of a synchronization signal block may be indicated, or when the location is preconfigured, the location may not be indicated. The terminal receives, based on information received on the carrier on which the synchronization is remained, the second synchronization signal block on the carrier on which the terminal is out-of-synchronization with the base station, to perform time and frequency synchronization. For example, the base station sends downlink control information to the terminal on a first carrier (a carrier on which the terminal is not out-of-synchronization with the base station), where the downlink control information includes indicating information that is used to indicate that the second synchronization signal block is sent on a second carrier (a carrier on which the terminal is out-of-synchronization with the base station); and the base station sends the second synchronization signal block to the terminal on the second carrier. In this way, the terminal may receive, on the first carrier, the downlink control information sent by the base station, and receive, on the second carrier according to the indicating information, the second synchronization signal block sent by the base station. In another possible case, FIG. 10 is a schematic diagram of a method for sending a second synchronization signal block during multicarrier communication according to an embodiment of this application. As shown in FIG. 10, when the terminal determines that the terminal is out-of-synchronization with the base station on a carrier and remains synchronized with the base station on another carrier, the terminal sends uplink control information to the base station on the carrier on which the terminal remains synchronized with the base station, where the uplink control information includes information indicating out-of-synchronization on a second carrier or a synchronization signal obtaining request. After receiving the uplink control information, the base station sends a second synchronization signal block on the second carrier. In this case, the base station may notify, on the carrier on which the terminal is synchronized with the base station, the terminal that the second synchronization signal block is to be sent on the carrier on which the terminal is out-of-synchronization with the base station, and indicate a location of a time-frequency resource for sending a synchronization signal block. Alternatively, the base station may not indicate the location of the time-frequency resource, but preconfigures the location of the time-frequency resource. In addition, alternatively, the base station may not indicate that the second synchronization signal block is sent on the carrier on which the terminal is out-of-synchronization with the base station, because the terminal knows out-of-synchronization on the carrier, and may further know that the second synchronization signal block is to be received on the carrier. The terminal receives the second synchronization signal block on the carrier on which the terminal is out-of-synchronization with the base station.

Figure 11:
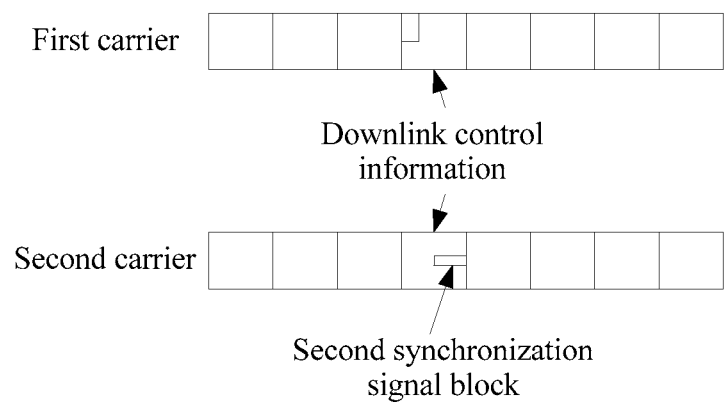
FIG. 11 is an example diagram showing that a base station sends a second synchronization signal block to a terminal during multicarrier communication according to a specific embodiment of this application.

FIG. 11 is an example diagram showing that a base station sends a second synchronization signal block to a terminal during multicarrier communication according to a specific embodiment of this application. As shown in FIG. 11, the base station and the terminal communicate by using a first carrier and a second carrier, where the first carrier is a primary component carrier, and the second carrier is a secondary component carrier. If the terminal remains synchronized on the primary component carrier, but is out-of-synchronization on the secondary component carrier, the base station may determine that out-of-synchronization occurs on the secondary component carrier, and send downlink control information to the terminal on the primary component carrier. The downlink control information includes an indication indicating that the base station is to send the second synchronization signal block to the terminal on the secondary component carrier. In addition, information about a physical resource occupied by the second synchronization signal block may further be sent, including one or more of a time resource, a frequency resource, and a code resource. Certainly, when the resource is preconfigured, the information about the physical resource may not be sent. The terminal receives the second synchronization signal block on the secondary component carrier. It should be noted that, information about the second synchronization signal block may alternatively be sent to the terminal on the secondary component carrier by using higher layer signaling or other signaling.

Figure 12:
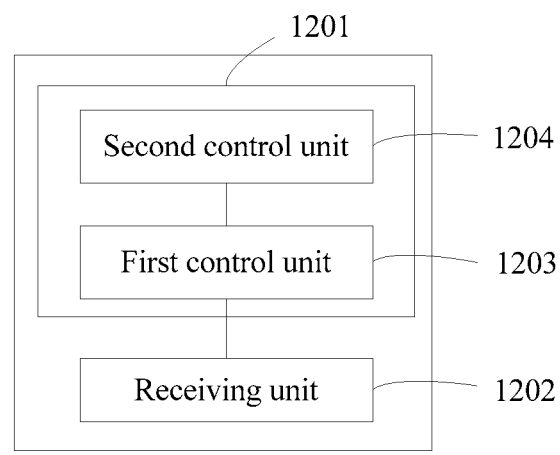
FIG. 12 is a schematic diagram of a communications apparatus according to an embodiment of this application.

FIG. 12 is a schematic diagram of a communications apparatus according to an embodiment of this application. As shown in FIG. 12, the communications apparatus may be applied to the base station in the foregoing method embodiments. The communications apparatus includes a control unit 1201 and a receiving unit 1202. The control unit includes a first control unit 1203 and a second control unit 1204.

The first control unit 1203 is configured to send a first synchronization signal block, where the first synchronization signal block includes a primary synchronization signal, a secondary synchronization signal, and information carried on a physical broadcast channel, and the first synchronization signal block is used by a terminal to access the base station.

The second control unit 1204 is configured to send a second synchronization signal block, where the second synchronization signal block includes a primary synchronization signal or includes a primary synchronization signal and a secondary synchronization signal, and does not include information carried on the physical broadcast channel, and the second synchronization signal block is used to perform time and frequency synchronization after the terminal accesses the base station.

A time length of the first synchronization signal block is greater than a time length of the second synchronization signal block.

On one hand, the first control unit 1203 controls periodic sending of the first synchronization signal block.

On another hand, the second control unit 1204 controls periodic sending or aperiodic sending of the second synchronization signal block.

In a case, the aperiodic sending of the second synchronization signal block is event-triggered sending.

The aperiodically sending the second synchronization signal block is: The second control unit 1204 sends the second synchronization signal block when sending a paging signal. The second synchronization signal block and the paging signal are sent in a same time unit.

The sending the second synchronization signal block when the base station is triggered by an event is: The receiving unit 1202 receives a random access preamble sent by the terminal. The second control unit 1204 sends the second synchronization signal block to the terminal based on the random access preamble.

The sending the second synchronization signal block when the base station is triggered by an event is: The second control unit 1204 sends downlink control information to the terminal on a first carrier, where the downlink control information includes information for indicating that the second synchronization signal block is sent on a second carrier. The second control unit 1204 sends the second synchronization signal block to the terminal on the second carrier.

The sending the second synchronization signal block when the base station is triggered by an event is: The receiving unit 1202 receives, on a first carrier, uplink control information sent by the terminal, where the uplink control information includes information indicating out-of-synchronization on the second carrier. The second control unit 1204 sends the second synchronization signal block based on the uplink control information on the second carrier.

The first control unit 1203 controls sending of a first synchronization signal burst, where the first synchronization signal burst includes at least one first synchronization signal block. The second control unit 1204 controls sending of a second synchronization signal burst, where the second synchronization signal burst includes at least one second synchronization signal block. A maximum quantity of first synchronization signal blocks included in the first synchronization signal burst is M and a maximum quantity of second synchronization signal blocks included in the second synchronization signal burst is N, where M and N are positive integers. M and N are configured by the base station or M and N are predefined parameters. M and N are different. At least one of the primary synchronization signals and the secondary synchronization signals of the first synchronization signal block and the second synchronization signal block are different in at least one of the following: occupied time resource, occupied frequency resource, and candidate sequence.

It should be understood that division of the units of the foregoing communications apparatus is merely logical function division, and in an actual implementation, the units may be all or partially integrated into one physical entity, or may be physically separated. In addition, these units may all be implemented in a form of software invoked by a processing element; or may all be implemented in a form of hardware; or some units may be implemented in a form of software invoked by a processing element, and some units are implemented in a form of hardware. For example, the first control unit may be an independently disposed processing element, or may be integrated into a chip of the base station for implementation. In addition, the first control unit may alternatively be stored in a form of a program into a memory of the base station, and a processing element of the base station invokes and performs a function of the first control unit. Implementations of the other units are similar thereto. It should be noted that, the receiving unit may communicate with the terminal through a radio frequency apparatus and an antenna. For example, the base station may receive, through the antenna, information sent by the terminal, and the received information is sent to the receiving unit after being processed by the radio frequency apparatus. In addition, the units of the communications apparatus may be all or partially integrated, or may be implemented independently. The processing element herein may be an integrated circuit that has a signal processing capability. In an implementation process, steps in the foregoing methods or the foregoing units may be implemented by using a hardware integrated logic circuit in the processing element, or by using instructions in a form of software.

For example, the foregoing units may be configured as one or more integrated circuits for implementing the foregoing method, for example, one or more application-specific integrated circuits (ASIC), or one or more microprocessors (DSP), or one or more field programmable gate arrays (FPGA). For another example, when a unit described above is implemented in a form of invoking a program by a processing element, the processing element may be a general-purpose processor, for example, a central processing unit (CPU) or another processor that can invoke a program. For another example, these units may be integrated, and implemented in a form of a system-on-a-chip (SOC).

Figure 14:
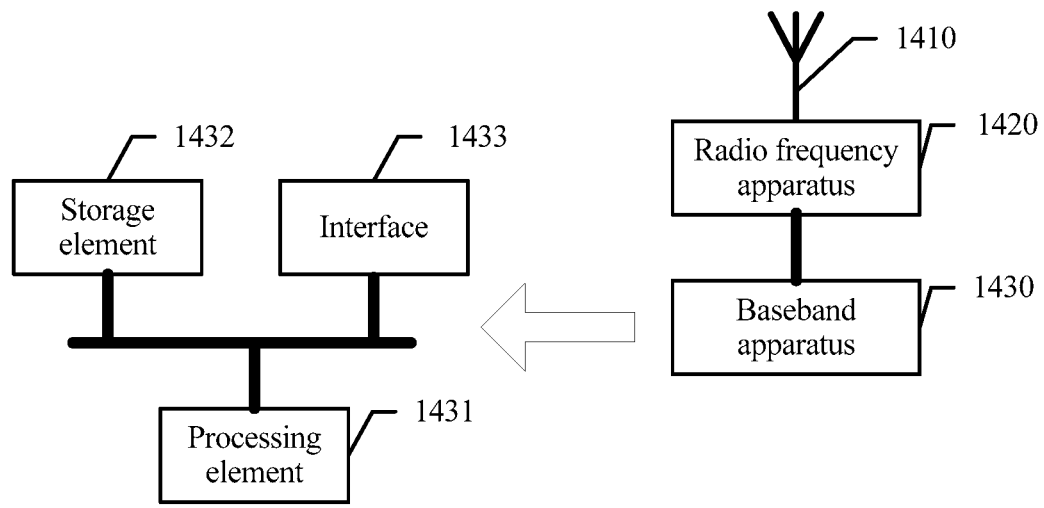
FIG. 14 is a schematic structural diagram of a base station according to an embodiment of this application.

FIG. 14 is a schematic structural diagram of a base station according to an embodiment of this application. As shown in FIG. 14, the base station includes an antenna 1410, a radio frequency apparatus 1420, and a baseband apparatus 1430. The antenna 1410 is connected to the radio frequency apparatus 1420. In an uplink direction, the radio frequency apparatus 1420 receives, through the antenna 1410, information sent by the terminal, and sends, to the baseband apparatus 1430, the information sent by the terminal for processing. In a downlink direction, the baseband apparatus 1430 processes information for the terminal, and sends the information for the terminal to the radio frequency apparatus 1420. The radio frequency apparatus 1420 processes the information for the terminal, and then sends the processed information for the terminal to the terminal through the antenna 1410.

The foregoing communications apparatus may be located in the baseband apparatus 1430. In an implementation, the foregoing units are implemented in a form of invoking a program by a processing element. For example, the baseband apparatus 1430 includes a processing element 1431 and a storage element 1432. The processing element 1431 invokes a program stored in the storage element 1432, to perform the method in the foregoing method embodiment. In addition, the baseband apparatus 1430 may further include an interface 1433, configured to exchange information with the radio frequency apparatus 1420. The interface is, for example, a common public radio interface (CPRI).

In another implementation, the foregoing units may be configured as one or more processing elements for implementing the foregoing method. These processing elements are disposed on the baseband apparatus 1430. The processing elements herein may be integrated circuits, for example, one or more ASICs, or one or more DSPs, or one or more FPGAs. These integrated circuits may be integrated to form a chip.

For example, the foregoing units may be integrated, and implemented in a form of a system-on-a-chip (SOC). For example, the baseband apparatus 1430 includes a SOC chip, configured to implement the foregoing method.

Same as the foregoing descriptions, the processing element herein may be a general-purpose processor, for example, a central processing unit (CPU), or may be configured as one or more integrated circuits for implementing the foregoing method, for example, one or more application-specific integrated circuits (ASIC), or one or more microprocessors (DSP), or one or more field programmable gate arrays (FPGA).

Figure 13:
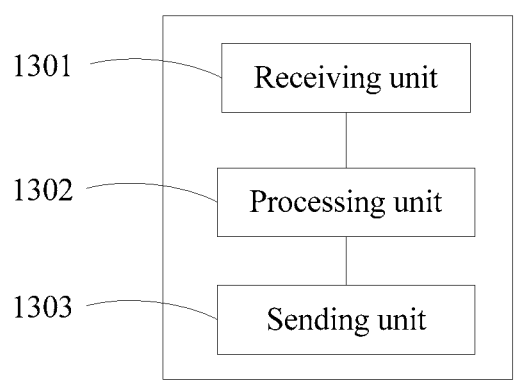
FIG. 13 is a schematic diagram of another communications apparatus according to a specific embodiment of this application.

The storage element may be one memory, or may be a general term of a plurality of storage elements. FIG. 13 is a schematic diagram of another communications apparatus according to a specific embodiment of this application. The communications apparatus is applied to the terminal in the foregoing method embodiments. The communications apparatus includes a receiving unit 1301, a processing unit 1302, and a sending unit 1303.

The receiving unit 1301 is configured to receive a first synchronization signal block sent by a base station, where the first synchronization signal block includes a primary synchronization signal, a secondary synchronization signal, and information carried on a physical broadcast channel.

The processing unit 1302 is configured to access the base station based on the first synchronization signal block.

The receiving unit 1301 is configured to receive a second synchronization signal block sent by the base station, where the second synchronization signal block includes a primary synchronization signal or includes a primary synchronization signal and a secondary synchronization signal, and does not include information carried on the physical broadcast channel.

The processing unit 1302 is configured to perform time and frequency synchronization based on the second synchronization signal block after the terminal accesses the base station.

A time length of the first synchronization signal block is greater than a time length of the second synchronization signal block.

The receiving unit 1301 is configured to receive the second synchronization signal block when receiving a paging signal.

The receiving unit 1301 receives, in a same time unit where the paging signal is received, the second synchronization signal block sent by the base station.

The apparatus further includes the sending unit 1303. The sending unit 1303 is configured to send a random access preamble to the base station, where the random access preamble is used to trigger the base station to send the second synchronization signal block.

The receiving unit 1301 receives, on a first carrier, downlink control information sent by the base station, where the downlink control information includes information indicating that the second synchronization signal block is sent on a second carrier. That the receiving unit receives a second synchronization signal block sent by the base station includes: the receiving unit 1301 receives, on the second carrier, the second synchronization signal block sent by the base station.

The apparatus further includes the sending unit 1303. The sending unit 1303 sends uplink control information to the base station on a first carrier, where the uplink control information includes information indicating out-of-synchronization on a second carrier. That the receiving unit 1301 is configured to receive a second synchronization signal block sent by the base station includes: the receiving unit 1301 receives, on the second carrier, the second synchronization signal block sent by the base station.

It should be understood that division of the units of the foregoing communications apparatus is merely logical function division, and in an actual implementation, the units may be all or partially integrated into one physical entity, or may be physically separated. In addition, these units may all be implemented in a form of software invoked by a processing element; or may all be implemented in a form of hardware; or some units may be implemented in a form of software invoked by a processing element, and some units are implemented in a form of hardware. For example, the processing unit may be an independently disposed processing element, or may be integrated into a chip of the terminal for implementation. In addition, the processing unit may alternatively be stored in a form of a program into a memory of the terminal, and a processing element of the terminal invokes and performs a function of the processing unit. Implementations of the other units are similar thereto. The terminal may receive, through an antenna, information sent by the base station. The information is sent to a baseband apparatus after being processed by a radio frequency apparatus. The foregoing receiving unit may receive, through an interface between the radio frequency apparatus and the baseband apparatus, the information sent by the base station. In addition, the units of the communications apparatus may be all or partially integrated, or may be implemented independently. The processing element herein may be an integrated circuit that has a signal processing capability. In an implementation process, steps in the foregoing methods or the foregoing units may be implemented by using a hardware integrated logic circuit in the processing element, or by using instructions in a form of software.

For example, the foregoing units may be configured as one or more integrated circuits for implementing the foregoing method, for example, one or more application-specific integrated circuits (ASIC), or one or more microprocessors (DSP), or one or more field programmable gate arrays (FPGA). For another example, when a unit described above is implemented in a form of invoking a program by a processing element, the processing element may be a general-purpose processor, for example, a central processing unit (CPU) or another processor that can invoke a program. For another example, these units may be integrated, and implemented in a form of a system-on-a-chip (SOC).

Figure 15:
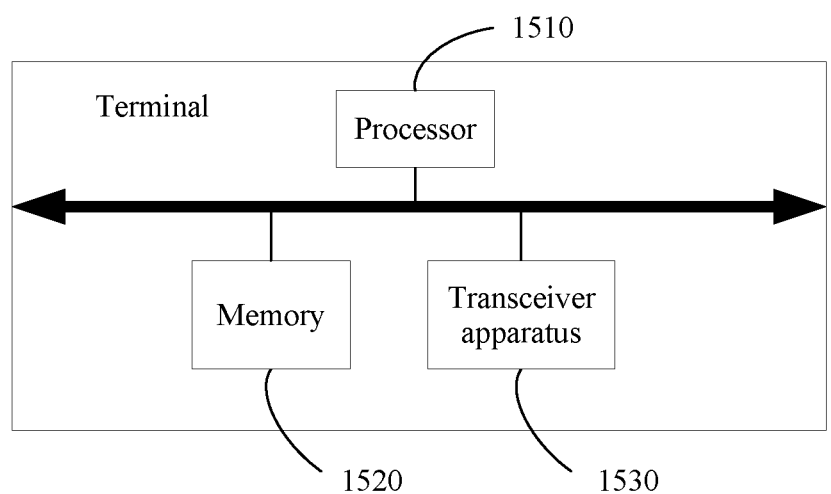
FIG. 15 is a schematic diagram of a terminal according to an embodiment of this application.

FIG. 15 is a schematic diagram of a terminal according to an embodiment of this application. As shown in FIG. 15, the terminal includes a processor 1510, a memory 1520, and a transceiver apparatus 1530. The transceiver apparatus 1530 may be connected to an antenna. In a downlink direction, the transceiver apparatus 1530 receives, through the antenna, information sent by a base station, and sends the information to the processor 1510 for processing. In an uplink direction, the processor 1510 processes data of the terminal, and sends the data to the base station through the transceiver apparatus 1530.

The memory 1520 is configured to store a program for implementing any method performed by the terminal in the foregoing method embodiments. The processor 1510 invokes the program, to perform operations in the foregoing method embodiments, to implement the units shown in FIG. 13.

Alternatively, the foregoing units may all or partially be embedded in a chip of the terminal in a form of an integrated circuit for implementation, and may be implemented independently or may be integrated. To be specific, the foregoing units may be configured as one or more integrated circuits for implementing the foregoing method, for example, one or more ASICs, or one or more DSPs, or one or more FPGAs.

The units and algorithm steps of the examples described with reference to the embodiments disclosed in this specification can be implemented by using electronic hardware, computer software, or a combination thereof. For clarity of description of interchangeability of hardware and software, the composition and steps of the examples are generally described in terms of function in the foregoing descriptions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementations, the objective, technical solutions, and beneficial effects of this application are further described in detail. It should be understood that the foregoing descriptions are merely specific implementations of this application, but are not intended to limit the protection scope of this application. Any modification, equivalent replacement, or improvement made without departing from the spirit and principle of this application should fall within the protection scope of this application.

What is claimed is:

1. A communication method, the communication method comprising:
   receiving, by a terminal, a first synchronization signal block from a base station, wherein the first synchronization signal block comprises a primary synchronization signal, a secondary synchronization signal, and information that is carried on a physical broadcast channel;
   accessing, by the terminal, the base station based on the first synchronization signal block;
   receiving, by the terminal, a second synchronization signal block from the base station, wherein the second synchronization signal block comprises a primary synchronization signal, or comprises a primary synchronization signal and a secondary synchronization signal, and wherein the second synchronization signal block does not comprise information carried on the physical broadcast channel; and
   after accessing the base station based on the first synchronization signal block, performing, by the terminal, time and frequency synchronization based on the second synchronization signal block.

2. The method according to claim 1, wherein a time length of the first synchronization signal block is greater than a time length of the second synchronization signal block.

3. The method according to claim 1, wherein the first synchronization signal block is periodically sent, and wherein the second synchronization signal block is periodically sent or aperiodically sent.

4. The method according to claim 1, wherein one or more of the following is used to differentiate the first synchronization signal block and the second synchronization signal block:
   the primary synchronization signals of the first synchronization signal block and the second synchronization signal block occupy different time resources;
   the primary synchronization signals of the first synchronization signal block and the second synchronization signal block occupy different frequency resources;
   the primary synchronization signals of the first synchronization signal block and the second synchronization signal block use different candidate sequences;
   the secondary synchronization signals of the first synchronization signal block and the second synchronization signal block occupy different time resources;
   the secondary synchronization signals of the first synchronization signal block and the second synchronization signal block occupy different frequency resources; or
   the secondary synchronization signals of the first synchronization signal block and the second synchronization signal block use different candidate sequences.

5. The method according to claim 1, wherein the receiving the second synchronization signal block comprises:
   receiving the second synchronization signal block when receiving a paging signal.

6. The method according to claim 5, wherein the receiving the second synchronization signal block comprises:

receiving the second synchronization signal block in a time unit where the paging signal is received.

7. The method according to claim 1, wherein the method further comprises:
sending a random access preamble to the base station, wherein the random access preamble is used to trigger the base station to send the second synchronization signal block.

8. The method according to claim 1, wherein the method further comprises:
receiving, on a first carrier, downlink control information from the base station, wherein the downlink control information comprises indicating information that is used to indicate that the second synchronization signal block is sent by the base station on a second carrier; and
wherein the receiving the second synchronization signal block comprises:
receiving, on the second carrier according to the indicating information, the second synchronization signal block from the base station.

9. The method according to claim 1, wherein the method further comprises:
sending uplink control information to the base station on a first carrier, wherein the uplink control information comprises information indicating out-of-synchronization on a second carrier; and
wherein the receiving the second synchronization signal block comprises:
receiving, on the second carrier, the second synchronization signal block from the base station.

10. An apparatus, the apparatus comprising:
a non-transitory computer readable storage medium; and
at least one processor configured to couple with the non-transitory computer readable storage medium, wherein the non-transitory computer readable storage medium stores a program, and wherein the program, when executed by the at least one processor, causes the following steps to be performed:
receiving a first synchronization signal block from a base station, wherein the first synchronization signal block comprises a primary synchronization signal, a secondary synchronization signal, and information that is carried on a physical broadcast channel;
accessing the base station based on the first synchronization signal block;
receiving a second synchronization signal block from the base station, wherein the second synchronization signal block comprises a primary synchronization signal, or comprises a primary synchronization signal and a secondary synchronization signal, and does not comprise information carried on the physical broadcast channel; and
after accessing the base station based on the first synchronization signal block, performing time and frequency synchronization based on the second synchronization signal block.

11. The apparatus according to claim 10, wherein a time length of the first synchronization signal block is greater than a time length of the second synchronization signal block.

12. The apparatus according to claim 10, wherein the first synchronization signal block is periodically sent, and wherein the second synchronization signal block is periodically sent or aperiodically sent.

13. The apparatus according to claim 10, wherein the receiving the first synchronization signal block comprises:
receiving a first synchronization signal burst from the base station, wherein the first synchronization signal burst comprises at least one first synchronization signal block; and
wherein the receiving the second synchronization signal block comprises:
receiving a second synchronization signal burst from the base station, wherein the second synchronization signal burst comprises at least one second synchronization signal block.

14. The apparatus according to claim 10, wherein one or more of the followings is used to differentiate the first synchronization signal block and the second synchronization signal block:
the primary synchronization signals of the first synchronization signal block and the second synchronization signal block occupy different time resources;
the primary synchronization signals of the first synchronization signal block and the second synchronization signal block occupy different frequency resources;
the primary synchronization signals of the first synchronization signal block and the second synchronization signal block use different candidate sequences;
the secondary synchronization signals of the first synchronization signal block and the second synchronization signal block occupy different time resources;
the secondary synchronization signals of the first synchronization signal block and the second synchronization signal block occupy different frequency resources; or
the secondary synchronization signals of the first synchronization signal block and the second synchronization signal block use different candidate sequences.

15. The apparatus according to claim 10, wherein the receiving the second synchronization signal block comprises:
receiving the second synchronization signal block when receiving a paging signal.

16. The apparatus according to claim 15, wherein the receiving the second synchronization signal block comprises:
receiving the second synchronization signal block in a time unit where the paging signal is received.

17. The apparatus according to claim 10, wherein the program, when executed by the at least one processor, causes the following step to be performed:
sending a random access preamble to the base station, wherein the random access preamble is used to trigger the base station to send the second synchronization signal block.

18. The apparatus according to claim 10, wherein the program, when executed by the at least one processor, causes the following step to be performed:
receiving, on a first carrier, downlink control information from the base station, wherein the downlink control information comprises indicating information that is used to indicate that the second synchronization signal block is sent by the base station on a second carrier; and
wherein the receiving the second synchronization signal block comprises:
receiving, on the second carrier according to the indicating information, the second synchronization signal block from the base station.

19. The apparatus according to claim 10, wherein the program, when executed by the at least one processor, causes the following steps to be performed:
sending uplink control information to the base station on a first carrier, wherein the uplink control information comprises information indicating out-of-synchronization on a second carrier; and wherein the receiving the second synchronization signal block comprises:
receiving, on the second carrier, the second synchronization signal block from the base station.

20. A non-transitory computer readable storage medium, wherein the non-transitory computer readable storage medium stores a program, and wherein the program, when executed by at least one processor, causes the following steps to be performed:

receiving a first synchronization signal block from a base station, wherein the first synchronization signal block comprises a primary synchronization signal, a secondary synchronization signal, and information that is carried on a physical broadcast channel;

accessing the base station based on the first synchronization signal block;

receiving a second synchronization signal block from the base station, wherein the second synchronization signal block comprises a primary synchronization signal, or comprises a primary synchronization signal and a secondary synchronization signal, and does not comprise information carried on the physical broadcast channel; and after accessing the base station based on the first synchronization signal block, performing time and frequency synchronization based on the second synchronization signal block.

* * * * *